United States Patent
Tefend (10) Patent No.: US 12,084,293 B2
(45) Date of Patent: Sep. 10, 2024

(54) PUSHER ELEMENT RETENTION ASSEMBLY FOR USE WITH A SORTATION CONVEYOR

(71) Applicant: TREW, LLC, Fairfield, OH (US)

(72) Inventor: Matthew J. Tefend, Columbus, OH (US)

(73) Assignee: Trew, LLC, Fairfield, OH (US)

( * ) Notice: Subject to any disclaimer, the term of this patent is extended or adjusted under 35 U.S.C. 154(b) by 0 days.

(21) Appl. No.: 17/891,691

(22) Filed: Aug. 19, 2022

(65) Prior Publication Data

US 2023/0055530 A1 Feb. 23, 2023

Related U.S. Application Data (60) Provisional application No. 63/234,831, filed on Aug. 19, 2021.

(51) Int. Cl.
| | | |
|---|---|---|
| *B65G 47/53* | (2006.01) | |
| *B65G 47/82* | (2006.01) | |
| *B65G 54/02* | (2006.01) | |

(52) U.S. Cl.
CPC .............. *B65G 47/53* (2013.01); *B65G 47/82* (2013.01); *B65G 54/02* (2013.01)

(58) Field of Classification Search
CPC ......... B65G 47/53; B65G 47/82; B65G 54/02
USPC ....................................................... 198/890
See application file for complete search history.

(56) References Cited

U.S. PATENT DOCUMENTS

| | | | |
|---|---|---|---|
| 6,481,559 B1* | 11/2002 | Maeda ................ | B65G 47/844 198/370.02 |
| 6,705,452 B2* | 3/2004 | Greve ................. | B65G 47/844 198/370.02 |
| 6,860,376 B1 | 3/2005 | Heit et al. | |
| 7,441,646 B2 | 10/2008 | Heit et al. | |
| 7,857,116 B2 | 12/2010 | Heit et al. | |
| 9,371,194 B2* | 6/2016 | Ragan ................ | B65G 17/345 |
| 2009/0032374 A1 | 2/2009 | Heit et al. | |
| 2013/0220770 A1 | 8/2013 | Ydoate et al. | |
| 2014/0360838 A1* | 12/2014 | Wilkins .............. | B65G 47/46 198/370.02 |
| 2016/0001978 A1 | 1/2016 | Ragan | |
| 2024/0002172 A1* | 1/2024 | Duecker ............. | B65G 57/24 |

OTHER PUBLICATIONS

International Search Report and Written Opinion dated Nov. 15, 2022 for Application No. PCT/US22/40863, 12 pages.

* cited by examiner

*Primary Examiner* — Gene O Crawford
*Assistant Examiner* — Lester Rushin, III
(74) *Attorney, Agent, or Firm* — Frost Brown Todd LLP (57) ABSTRACT

A sortation conveyor includes a pair of conveying members defining a conveying surface extending in a longitudinal direction. The sortation conveyor also includes an end cap fixedly secured to respective ends of the conveying members. The sortation conveyor further includes a pusher element selectively moveable across the conveying surface. The pusher element is releasably coupled to at least one of the conveying members or the end cap.

20 Claims, 10 Drawing Sheets

PUSHER ELEMENT RETENTION ASSEMBLY FOR USE WITH A SORTATION CONVEYOR

PRIORITY

This application claims the benefit of U.S. Pat. App. No. 63/234,831, entitled "Pusher Element Retention Assembly for Use with a Sortation Conveyor," filed Aug. 19, 2021, the disclosure of which is incorporated by reference herein.

BACKGROUND

Figure 1:
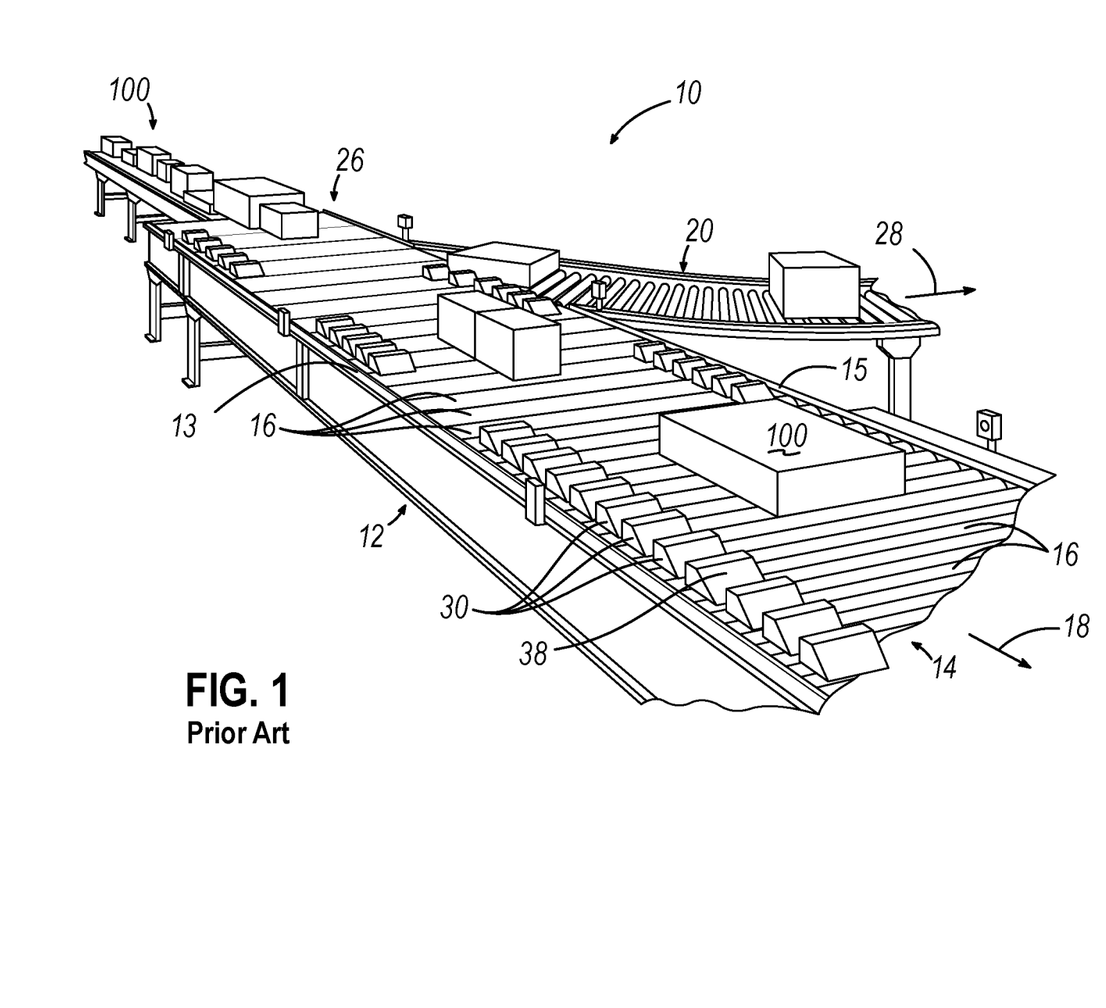
FIG. 1 is an isometric view of a portion of a prior art sortation conveyor.

The present disclosure relates to sortation conveyors, also known as sorters, for use with high volume distribution and fulfillment operations. Referring to FIG. 1, a sortation conveyor 10 typically comprises a first conveying surface 14 defined by a plurality of conveying members in the form of slats 16 extending laterally between a first side 13 and a second side 15 of a frame 12. The plurality of conveying members 16 are advanced in a downstream longitudinal direction to define a first conveying path 18 for conveying articles 100 (e.g., packages, cartons, boxes, etc.) along first conveying path 18.

Sortation conveyor 10 can selectively divert conveyed articles 100 from first conveying path 18 to a divert conveying path 28 defined by one or more divert conveyors 20, also known as diverts, branch conveyors, or spurs, extending transversely at divert locations 26 from either side of first conveying path 18. The conveyed articles 100 can be diverted by employing a plurality of pusher elements 30 that travel laterally (transverse to the longitudinal direction of travel of the first conveying path) along first conveying surface 14. For instance, if a particular article 100 is selected to continue travelling along first conveyor path 18, pusher elements 30 remain at a home location near a side of first conveying surface 14 opposite to divert conveyor 20. In the illustrated version, the home location is near first side 13 of sortation conveyor 10. If a particular article 100 is selected to be diverted at divert location 26 to divert conveying path 28, selected pusher elements 30 are diverted to travel laterally across first conveying surface 14, toward divert conveyor 20, to a spent location near the opposite side of first conveying surface 14. The selected pusher elements 30 thereby engage the particular article 100 and divert it onto divert conveyor 20 along divert conveying path 28. In the illustrated version, the spend location is near second side 15 of sortation conveyor 10.

Figure 2:
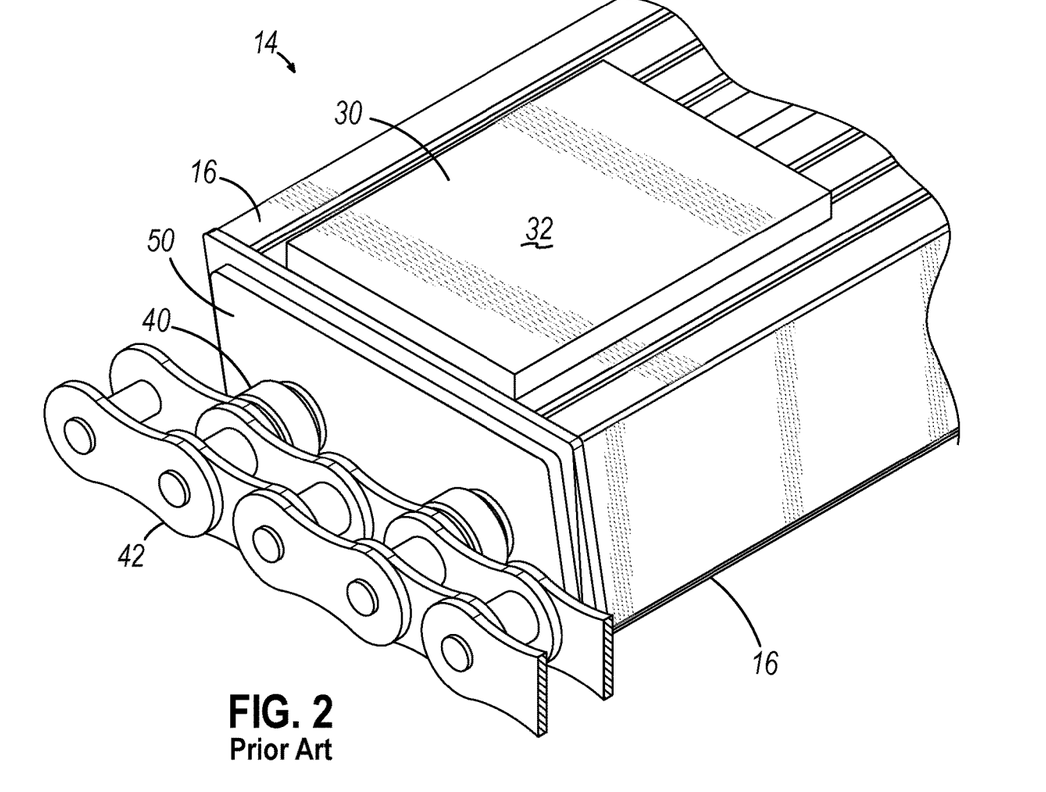
FIG. 2 is an enlarged fragmentary isometric view of an end portion of a first conveying surface of the sortation conveyor of FIG. 1 showing a pusher element, with a cap omitted for illustrative purposes, positioned between a pair of conveying members that are coupled with a prior art end cap.
Figure 3:
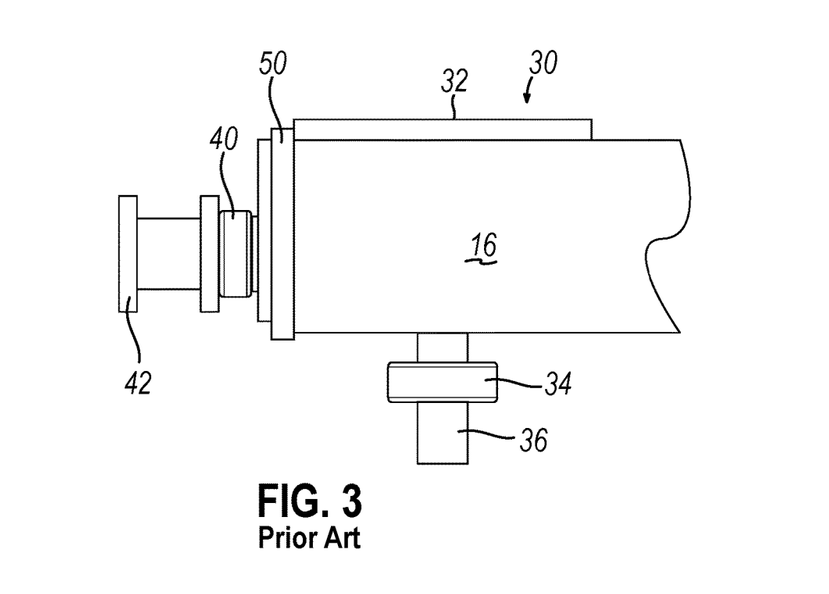
FIG. 3 is an enlarged fragmentary front view of the end portion of the first conveying surface of FIG. 2.

Referring to FIGS. 2-3, an end portion of conveying members 16 can be coupled with a bearing 40 and a drive chain 42 via an end cap 50. Bearings 40 are configured to support conveying members 16 on frame 12 of sortation conveyor 10 (see FIG. 1). Bearings 40 are couplable with drive chain 42 for driving conveying members 16 in the downstream longitudinal direction. In the illustrated version, an end portion of a pair of conveying members 16 is assembled with end cap 50 and a pusher element 30 is positioned between the pair of conveying members 16 such that pusher element is translatable between the pair of conveying members 16. Each pair of conveying members 16, corresponding end caps 50, and corresponding pusher element 30 may be collectively referred to as a "flight." Pusher element 30 includes a base 32 positioned above a respective conveying member 16 and a bearing 34 and a pin 36 disposed below a respective conveying member 16. For illustrative purposes, a cap 38 (see FIG. 1) of pusher element 30 has been omitted in FIGS. 2-3. Pin 36 is configured to engage a pin guide assembly (not shown) having a guide or track positioned underneath conveying members 16 to inhibit pusher element 30 from drifting laterally across first conveying surface 14 when the respective pusher element 30 is not diverted during operation of sortation conveyor 10. Such pin guide assemblies can be costly and time consuming to manufacture, install, and maintain. The pin guide assemblies can also produce noise when each respective pin and/or bearing is engaged with the pin guide assembly.

Accordingly, described herein is a pusher element retention assembly for use with a sortation conveyor instead of a pin guide assembly to retain the desired position of each respective pusher element to thereby reduce costs, increase efficiency, and/or eliminate noise associated with the sortation conveyor.

BRIEF DESCRIPTION OF THE DRAWINGS

The accompanying drawings illustrate embodiments which serve to explain the principles of the present innovation.

The drawings are not intended to be limiting in any way, and it is contemplated that various embodiments of the innovation may be carried out in a variety of other ways, including those not necessarily depicted in the drawings. The accompanying drawings incorporated in and forming a part of the specification illustrate several aspects of the present innovation, and together with the description serve to explain the principles of the innovation; it being understood, however, that this innovation is not limited to the precise arrangements shown.

DETAILED DESCRIPTION

The following description of certain examples of the innovation should not be used to limit the scope of the present innovation. Other examples, features, aspects, embodiments, and advantages of the innovation will become apparent to those skilled in the art from the following description, which is by way of illustration, one of the best modes contemplated for carrying out the innovation. As will be realized, the innovation is capable of other different and obvious aspects, all without departing from the innovation. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

For clarity of disclosure, spatial terms such as "underneath," "upstream," "downstream," "inner," "below," "above," "end," "top," "bottom," "inwardly," "outwardly," "interior," and "side" are used herein for reference to relative positions and directions. Such terms are used below with reference to views as illustrated for clarity and are not intended to limit the innovation described herein.

The word "exemplary" is used herein to mean "serving as an example, instance, or illustration." Any implementation described herein as "exemplary" is not necessarily to be construed as preferred or advantageous over other implementations.

A pusher element retention assembly is configured to maintain the position of at least one pusher element on a conveying surface of a sortation conveyor to inhibit the at least one pusher element from drifting across the conveying surface during operation of the sortation conveyor. The at least one pusher element comprises at least one first coupling and a select one or both of at least one end cap and at least one conveying member includes at least one second coupling that is selectively couplable with the at least one first coupling to thereby selectively couple the at least one first coupling and the at least one second coupling. As will be discussed in more detail below, the first and second couplings can include a magnet coupling, a mechanical coupling such as clips, and/or other suitable couplings for coupling the first and second couplings. The pusher element retention assembly can accordingly be incorporated into a sortation conveyor in place of the pin guide assembly. This may reduce costs and/or time of manufacturing, installing, and maintaining the sortation conveyor and/or reduce the amount of noise produced by the sortation conveyor.

I. Exemplary Pusher Element Retention Assembly

Figures 4, 4A, 5:
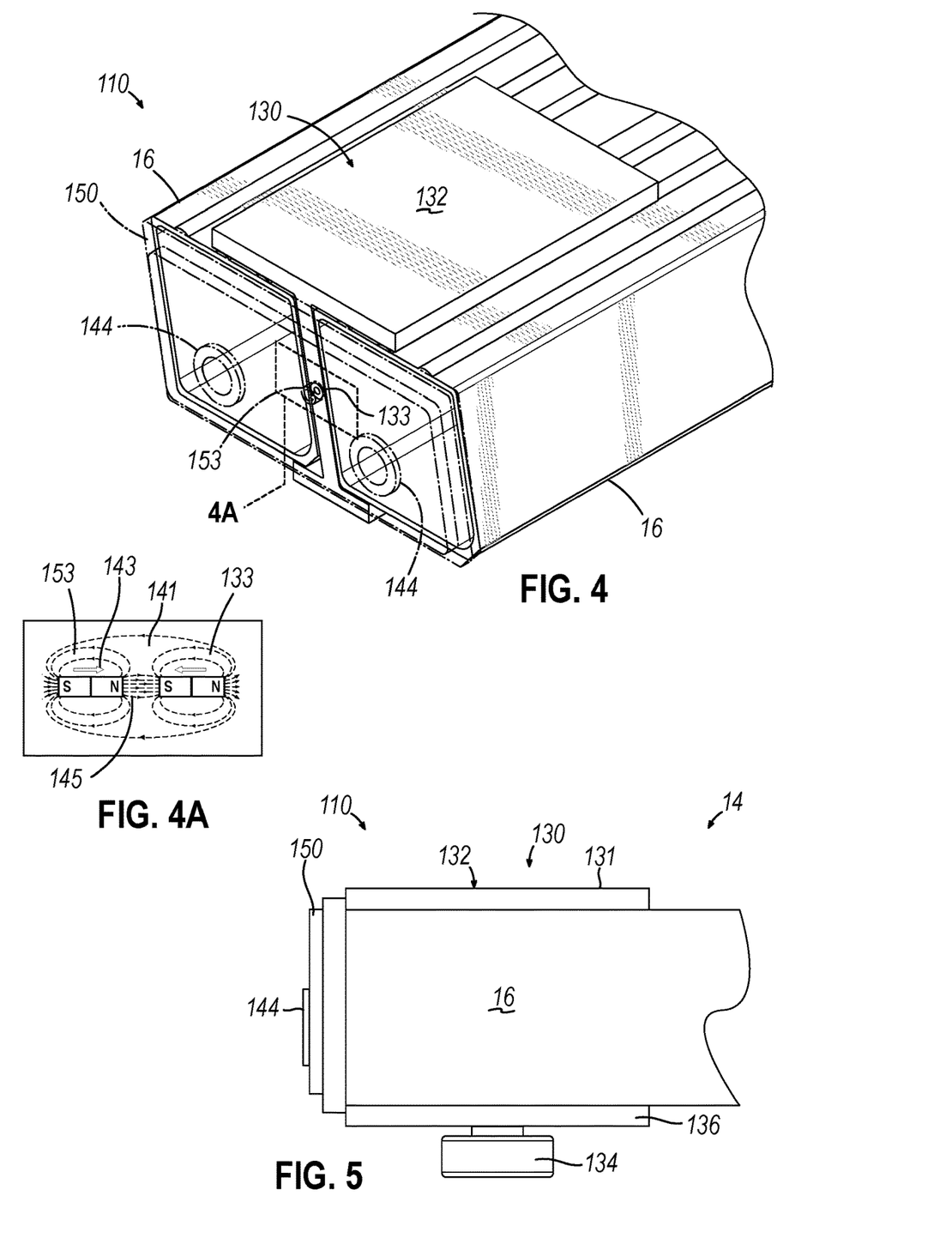
FIG. 4 is an isometric view of an exemplary pusher element retention assembly positioned at an end portion of a pair of conveying members of the sortation conveyor of FIG. 1, with a cap of a pusher element omitted for illustrative purposes.
FIG. 4A is an enlarged fragmentary front view of a first coupling and a second coupling of the pusher element retention assembly of FIG. 4 encircled by line 4A in FIG. 4.
FIG. 5 is a front view of the pusher element retention assembly of FIG. 4.

FIGS. 4-5 show an exemplary pusher element retention assembly 110 that can be incorporated into sortation conveyer 10 (see FIG. 1) to inhibit a pusher element 130 from drifting laterally across first conveying surface 14 when pusher element 130 is not diverted. Pusher element retention assembly 110 comprises an end cap 150 and a pusher element 130. End cap 150 is couplable with each opposite end portion of a pair of conveying members 16 of sortation conveyor 10 (see FIG. 1). For instance, while FIGS. 4-5 show end cap 150 coupled with one end portion of a pair of conveying members 16, end cap 150 can also be coupled with the other opposite end portion of the respective pair of conveying members 16 such that the description of end cap 150 at the one end portion can also apply to an end cap 150 at the other opposite end portion. Accordingly, end cap 150 can be coupled with each opposite end portion of each pair of conveying members 16 at first side 13 (see FIG. 1) and second side 15 (see FIG. 1) of sortation conveyor 10 (see FIG. 1). In some versions, end cap 150 can be coupled with any suitable number of one or more conveying members 16. Each pair of conveying members 16, corresponding end caps 150, and corresponding pusher element 130 may be collectively referred to as a "flight."

Pusher element 130 is positioned between the pair of conveying members 16 and between opposite end caps 150 such that pusher element 130 is laterally movable between the pair of conveying members 16 between end caps 150 across first conveying surface 14. As will be discussed in more detail below, pusher element 130 comprises at least one first coupling 133 and end cap 150 comprises at least one second coupling 153 that is selectively couplable with the at least one first coupling 133 to selectively couple pusher element 130 with end cap 150 to retain the position of pusher element 130 relative to end cap 150 when pusher element 130 is not diverted.

Figure 6:
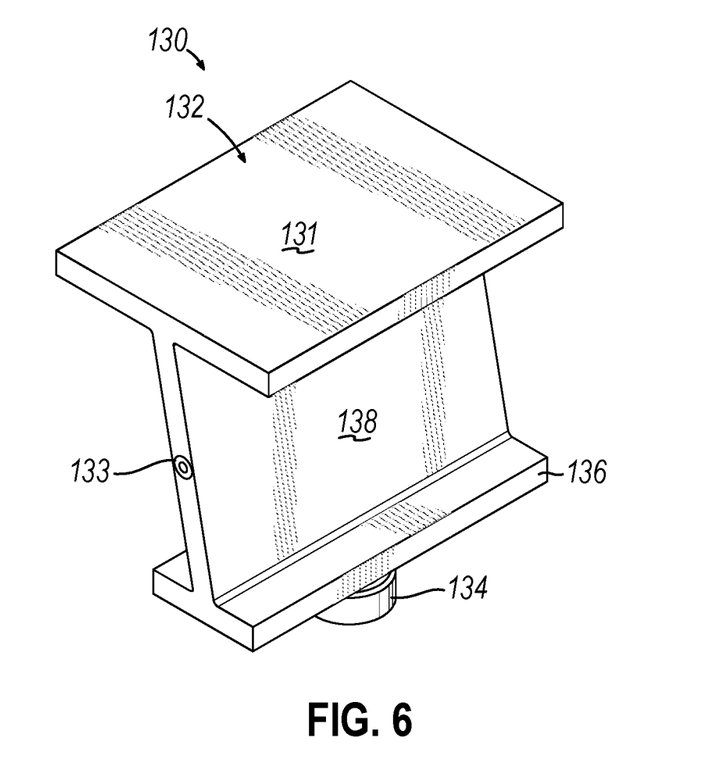
FIG. 6 is an isometric view of the pusher element of the pusher element retention assembly of FIG. 4.
Figure 7:
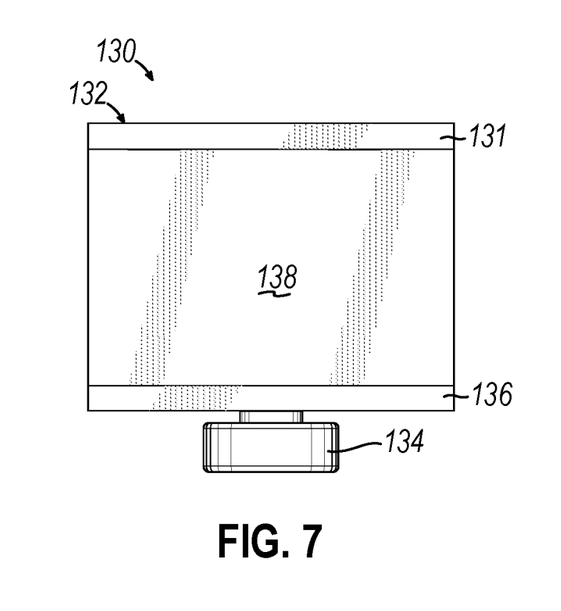
FIG. 7 is a front view of the pusher element of FIG. 6.
Figure 8:
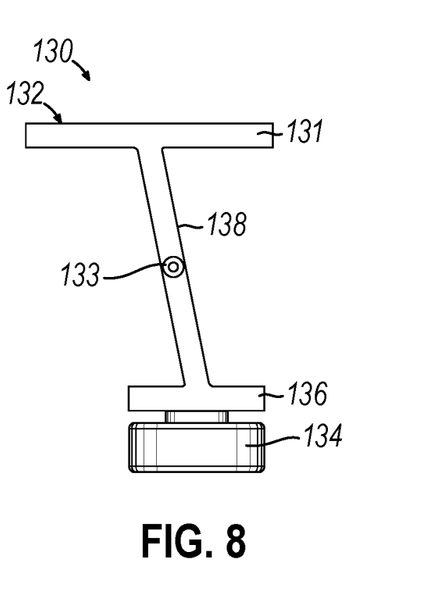
FIG. 8 is a side elevational view of the pusher element of FIG. 6.

Referring to FIGS. 6-8, pusher element 130 comprises a base 132 and a bearing 134 disposed below base 132. Base 132 is configured to be slidingly coupled between adjacent conveying members 16 and bearing 134 is configured to engage a divert guide track (not shown) when pusher element 130 is diverted. In the illustrated version, base 132 comprises a top member 131, a bottom member 136, and a web 138 extending between top member 131 and bottom member 136. A cap (not shown) may be coupled with top member 131 of base 132 for engaging an article 100 (see FIG. 1) being conveyed along first conveying surface 14. When base 132 is assembled between adjacent conveying members 16 (see FIG. 4), top member 131 is positioned above conveying members 16, bottom member 136 is positioned below conveying members 16, and web 138 is positioned between conveying members 16. Base 132 is thereby movable between conveying members 16. Web 138 of the illustrated version is shown as being skewed relative to top member 131 and bottom member 136 such that base 132 is configured to be assembled between a pair of conveying members 16 (see FIG. 4) having a skewed slat shape. In other versions, base 132 is configured to be assembled with other types of conveying members 16, such as circular tubes and/or composite honeycomb slats.

Base 132 further comprises at least one first coupling 133. In the illustrated version, a first coupling 133 is positioned on each side surface of web 138, but a first coupling 133 can be positioned on any portion of each side surface of base 132, such as on top member 131 and/or bottom member 136. First coupling 133 is selectively couplable with end cap 150. In the illustrated version, first coupling 133 includes a magnet, such as a permanent magnet that is made from a magnetized material (e.g., nickel, iron, cobalt, etc.) that creates its own persistent magnetic field having a pair of opposite north (N) and south (S) poles. Still other suitable configurations for first coupling 133 can be used, such as a mechanical coupling (e.g., a clip, a hook, etc.), to selectively couple first coupling 133 with end cap 150.

Figure 9:
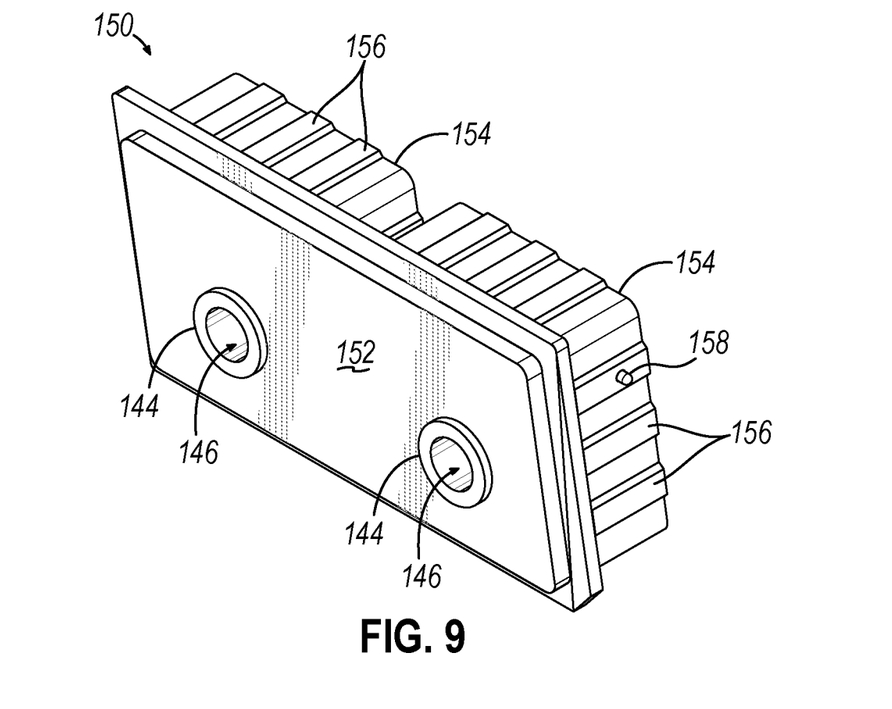
FIG. 9 is a left side isometric view of an end cap of the pusher element retention assembly of FIG. 4.
Figure 10:
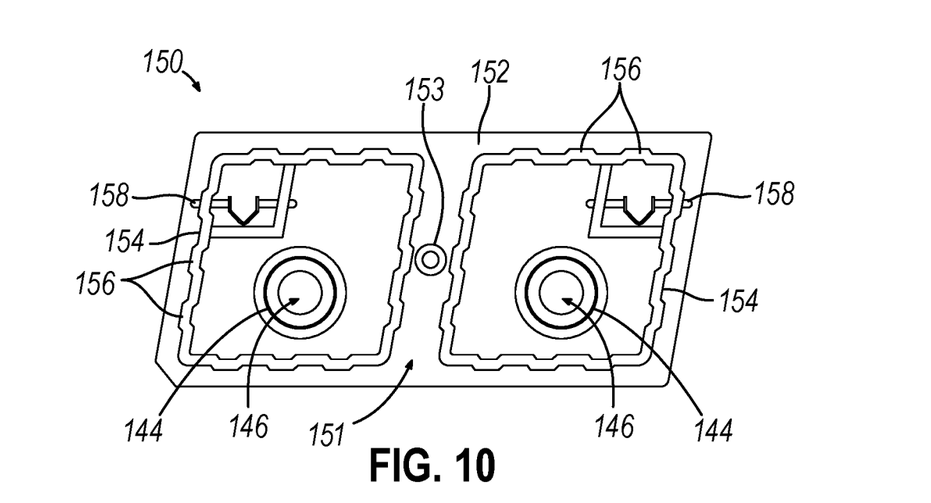
FIG. 10 is a right side elevational view of the end cap of FIG. 9.

Referring to FIGS. 9-10, end cap 150 comprises a plate 152 and a pair of protrusions 154 extending outwardly from plate 152 to define a gap 151 therebetween that is sized to receive web 138 of pusher element 130 therein. Each protrusion 154 is shaped to correspond to an end portion of a respective conveying member 16 (see FIG. 4) such that each protrusion 154 is configured to be inserted within the end portion of the respective conveying member 16. While the illustrated version shows end cap 150 having two protrusions 154 to receive two conveying members 16, end cap 150 can have any suitable number of protrusions to receive any suitable number of conveying members 16. Protrusions 154 may further form any suitable shape to correspond to the shape of conveying members 16 (e.g., square, rectangular, circular, elliptical, parallelogram, etc.). Protrusions 154 of the illustrated version comprise a plurality of ribs 156 undulating about each protrusion 154 such that ribs 156 are configured to aid in the installation of protrusion 154 within a conveying member 16.

Protrusions 154 further comprise a retention clip 158 extending within protrusions 154 for maintaining the position of protrusions 154 within the respective conveying member 16. Accordingly, retention clip 158 can be resiliently biased to be insertable within an opening on the respective conveying member 16. Still other suitable configurations can be used to assemble end cap 150 with conveying members 16, such as a friction fit, a fastener, a glue, etc. Protrusions 154 of the illustrated version are further shown as being skewed such that end cap 150 is configured to be assembled with a pair of conveying members 16 (see FIG. 4) having a skewed slat shape. In other versions, end cap 150 is configured to be assembled with other types of conveying members 16, such as circular tubes and/or composite honeycomb slats.

End cap 150 further comprises one or more bushings 144 extending through one or more openings 146 of plate 152 of end cap 150 for coupling end cap 150 with bearing 40 (see FIG. 2) and/or a drive chain 42 (see FIG. 2) of sortation conveyor 10 (see FIG. 1). Bushing 140 can be made from santoprene or any other suitable material. End cap 150 can be made from a super tough nylon material that is impact resistant, though other suitable materials can be used. End cap 150 further comprises at least one second coupling 153 positioned on interior surface of plate 152. In the illustrated versions, the at least one second coupling 153 is positioned within gap 151. In some other versions, at least one second coupling 153 can be positioned on other portions of plate 152. Second coupling 153 is selectively couplable with first coupling 133 of pusher element 130. In the illustrated version, second coupling 153 includes a magnet, such as a permanent magnet that is made from a material (e.g., nickel, iron, cobalt, etc.) that is magnetized and creates its own persistent magnetic field having a pair of opposite north (N) and south (S) poles. Still other suitable configurations for second coupling 153 can be used, such as a mechanical coupling (e.g., a clip, a hook, etc.), to selectively couple second coupling 153 with pusher element 130.

Referring back to FIGS. 1 and 4-5, pusher element retention assembly 110 is assembled with sortation conveyor 10 such that an end cap 150 is positioned on an end portion of a pair of conveying members 16 of first conveying surface 14 such that each end portion of the pair of conveying members 16 receives a respective protrusion 154 of end cap 150 within the end portion. Retention clips 158 of end cap 150 extending within each protrusion 154 of end cap 150 then engage each end portion of the respective conveying members 16 to maintain the position of protrusions 154 within conveying members 16. Pusher element 130 is positioned between the pair of conveying members 16 such that pusher element 130 is slidingly movable across first conveying surface 14 between the pair of conveying members 16. Web 138 of pusher element 130 is aligned with gap 151 of end cap 150 such that the at least one first coupling 133 of pusher element 130 is aligned with at least one second coupling 153 of end cap 150. Referring to FIG. 4A, the magnets of first and second couplings 133, 153 of the illustrated version are positioned with opposite poles (N-S) aligned with each other at a magnetic interface 145 to create a magnetic flux, shown by lines 141, that attract the magnets together, as shown by arrows 143, to thereby maintain the position of pusher element 130 relative to end cap 150.

During operation of sortation conveyor 10, upstream of a divert location 26, first and second couplings 133, 153 attract to one another to retain the position of pusher element 130 adjacent to end cap 150 at the home location. When pusher element 130 reaches divert location 26, if pusher element 130 is selected not to be diverted, first and second couplings 133, 153 remain coupled to maintain the position of pusher element 130 relative to end cap 150 to inhibit pusher element 130 from drifting laterally across first conveying surface 14. This allows pusher element 130 to continue traveling at the home location along first conveying path 18 when pusher element 130 is not diverted. If pusher element 130 is selected to be diverted, a switch can uncouple first and second couplings 133, 153 by guiding pusher element 130 toward divert conveyor 20, which thereby separates first and second couplings 133, 153 to allow pusher element 130 to translate laterally between the pair of conveying members 16 across first conveying surface 14 to the spent location to engage select articles 100 (see FIG. 1) being conveyed on first conveying surface 124 and divert them to divert conveyor 20.

Figure 11A:
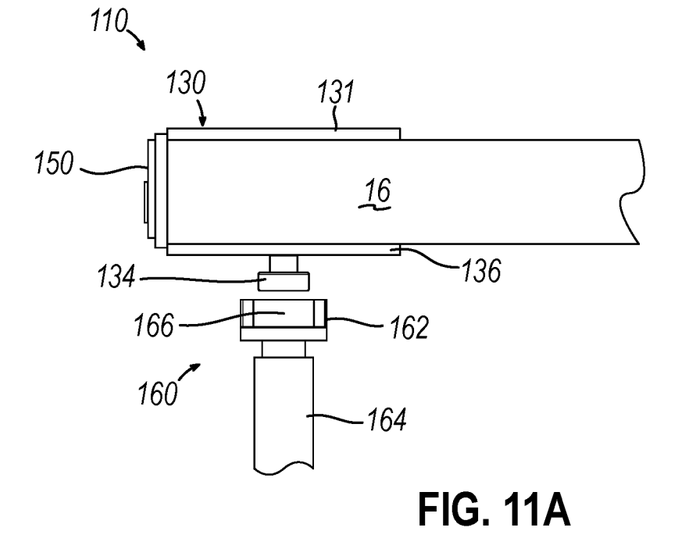
FIG. 11A is a front view of the pusher element retention assembly of FIG. 4, shown with a switch assembly in an unactuated position.
Figure 11B:
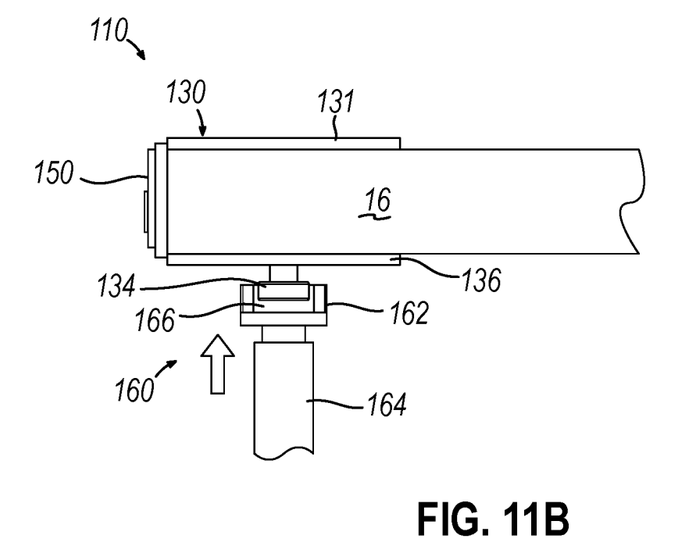
FIG. 11B is a front view of the pusher element retention assembly of FIG. 11A, shown with the switch assembly in an actuated position.
Figure 12A:
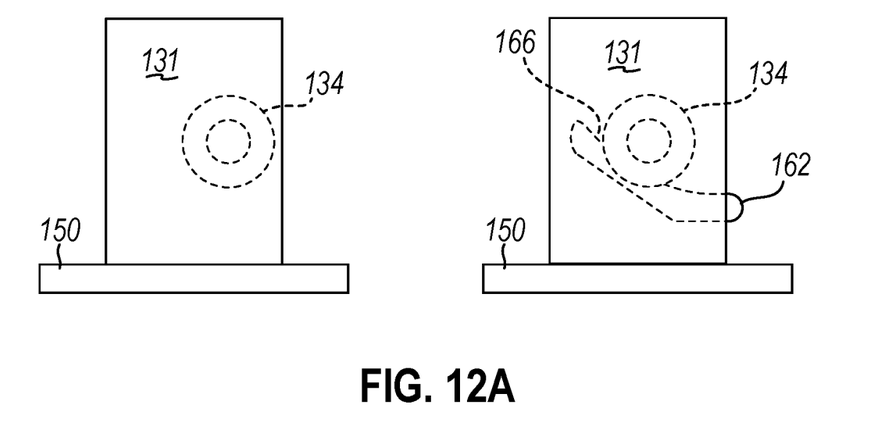
FIG. 12A is a schematic top plan view of the pusher element retention assembly of FIG. 11A, shown with the switch assembly in the unactuated position.
Figure 12B:
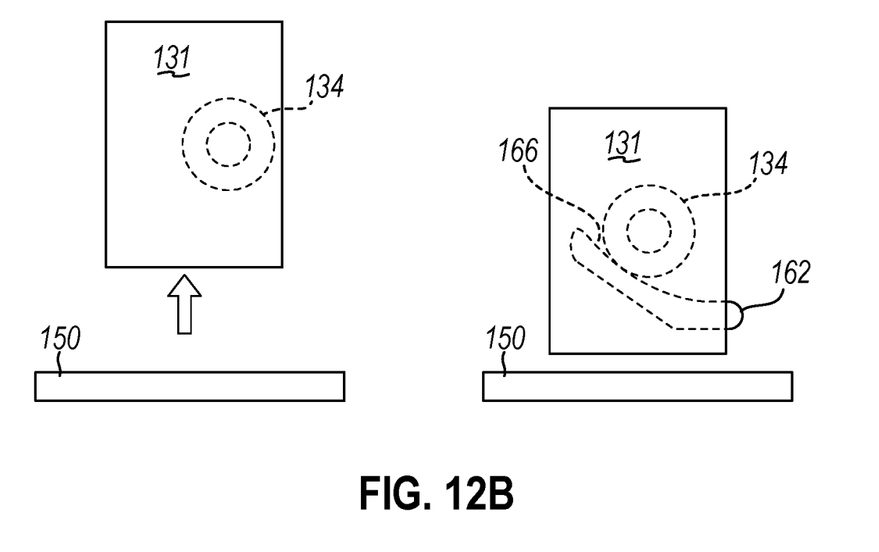
FIG. 12B is a schematic top plan view of the pusher element retention assembly of FIG. 11A, shown with the switch assembly in the actuated position.

For instance, referring to FIGS. 11A-12B, pusher element retention assembly 110 is shown with a switch assembly 160 for selectively guiding pusher element 130 to divert conveyor 20. Switch assembly 160 of the illustrated version comprises a switch 162 coupled with an actuator 164 to selectively actuate switch 162 from an unactuated position to an actuated position. Switch 162 can be positioned away from pusher element 130 in the unactuated position, as shown in FIGS. 11A and 12A, such that switch 162 does not engage pusher element 130. This allows pusher element 130 to remain coupled with end cap 150 to retain pusher element 130 with end cap 150 as pusher element 130 travels down home path 18 (see FIG. 1). Switch 162 can then be translated to an actuated position by actuator 164, as shown in FIGS. 11B and 12B, such that switch 162 engages bearing 134 of pusher element 130. Switch 162 of the illustrated version comprises an arcuate surface 166 configured to guide bearing 134 of pusher element 130 toward divert conveyor 20, which thereby uncouples first and second couplings 133, 153 to separate pusher element 130 from end cap 150. This allows pusher element 130 to travel laterally across first conveying surface 14. Once the selected pusher element 130 has been diverted, actuator 164 can return switch 162 to the unactuated position.

Once pusher element 130 has been diverted to the spent location, first coupling 133 on the opposite side of pusher element 130 can be coupled with a second coupling 153 of an end cap 150 on the opposite side of first conveying surface 124. This can maintain the position of pusher element 130 at the spent location to inhibit pusher element 130 from drifting laterally back across first conveying surface 124. A reset device (not shown) can then uncouple pusher element 130 from the end cap 150 on the opposite side of first conveying surface 124 to translate the spent pusher element 130 back to the home location at the beginning of sortation conveyor 10 to begin a new sortation cycle. Such a reset device can include a switch, such as switch 162 as described above, a rail, a track, or other suitable configuration to uncouple pusher element 130 from end cap 150. Still other suitable configurations for pusher element retention assembly 110 will be apparent to one with ordinary skill in the art in view of the teachings herein.

For instance, in some versions, one of pusher element 130 or end cap 150 can comprise a ferromagnetic metal or material (e.g., steel, iron, cobalt, nickel, magnetic plastic, etc.) instead of a magnet such that the magnet of the other one of pusher element 130 or end cap 150 is attracted to the ferromagnetic material to selectively couple the pusher element 130 and end cap 150. In some versions, both of pusher element 130 and end cap 150 can comprise a ferromagnetic metal or material (e.g., steel, iron, cobalt, nickel, magnetic plastic, etc.) instead of a magnet. It will also be appreciated that the magnets of the pusher element 130 and end cap 150 may have any suitable polarity. For example, the magnets may each have a single pole or may have multiple poles. In some other versions, first and second couplings 133, 153 can comprise a mechanical coupling instead of a magnetic coupling. For example, first and second couplings 133, 153 can comprise hook-and-loop fasteners or any other suitable type of mechanical coupling.

Figure 13:
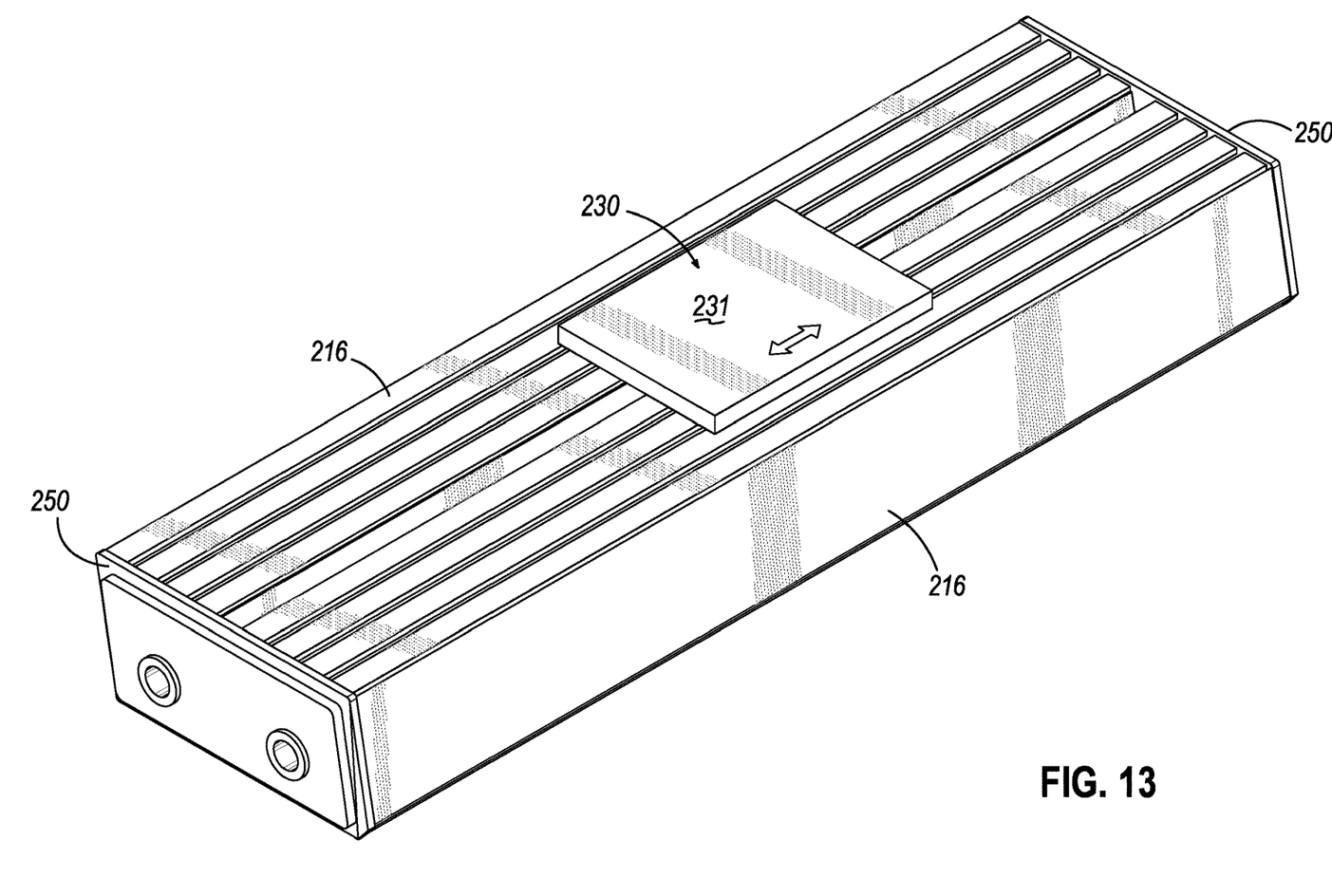
FIG. 13 is an isometric view of another exemplary pusher element retention assembly for use with the sortation conveyor of FIG. 1.
Figure 14:
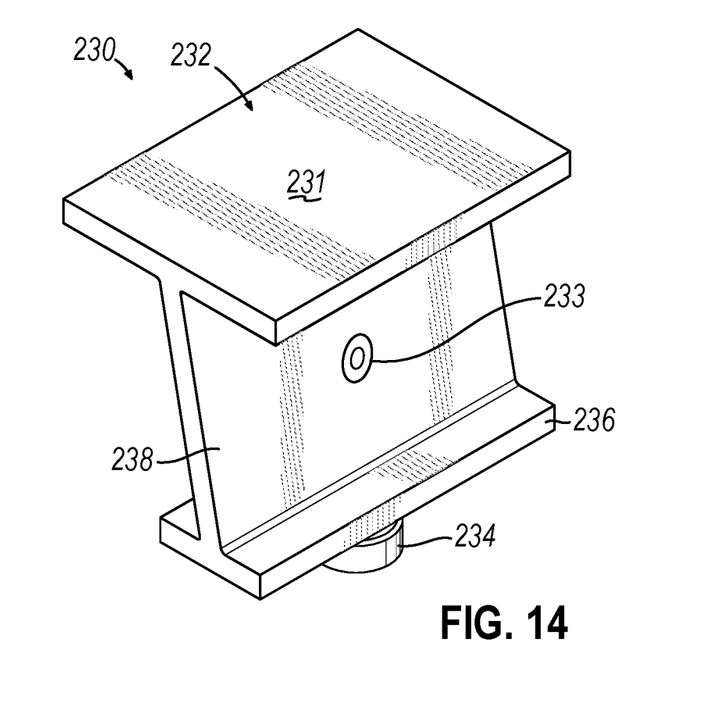
FIG. 14 is an isometric view of a pusher element of the pusher element retention assembly of FIG. 13.
Figure 15:
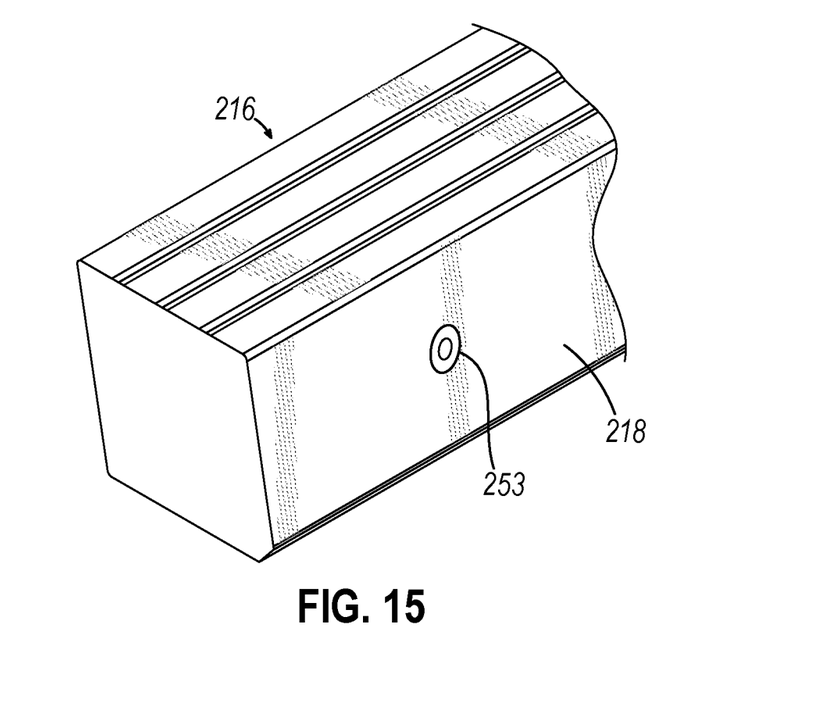
FIG. 15 is an isometric view of a conveying member of the pusher element retention assembly of FIG. 13.

Additionally or alternatively, a conveying member can comprise a coupling for retaining a pusher element. Referring to FIGS. 13-15, another exemplary pusher element retention assembly 210 is shown comprising a pusher element 230 positioned between a pair of conveying members in the form of slats 216. Pusher element 230 is similar to pusher element 130 discussed above in that pusher element 230 comprises a base 232 and a bearing 234 disposed below base 232. Base 232 is configured to be slidingly coupled between adjacent conveying members 216 and bearing 234 is configured to engage a divert guide track (not shown) when pusher element 230 is diverted. In the illustrated version, base 232 comprises a top member 231, a bottom member 236, and a web 238 extending between top member 231 and bottom member 236. A cap (not shown) may be coupled with top member 231 of base 232 for engaging an article 100 (see FIG. 1) being conveyed along first conveying surface 14. When base 232 is assembled between adjacent conveying members 216, top member 231 is positioned above conveying members 216, bottom member 236 is positioned below conveying members 216, and web 238 is positioned between conveying members 216. Base 232 is thereby movable between conveying members 216. Web 238 of the illustrated version is shown as being skewed relative to top member 231 and bottom member 236 such that base 232 is configured to be assembled between a pair of conveying members 216 having a skewed slat shape. In other versions, base 232 is configured to be assembled with other types of conveying members 216, such as circular tubes and/or composite honeycomb slats.

Base 232 further comprises at least one first coupling 233. In the illustrated version, a first coupling 233 is positioned on and interior front surface and/or rear surface of web 238, but a first coupling 233 can be positioned on any portion of interior front and/or rear surfaces of base 232, such as on top member 231 and/or bottom member 236. First coupling 233 is selectively couplable with one or both of conveying members 216. In the illustrated version, first coupling 233 includes a magnet, such as a permanent magnet that is made from a magnetized material (e.g., nickel, iron, cobalt, etc.) that creates its own persistent magnetic field having a pair of opposite north (N) and south (S) poles. Still other suitable configurations for first coupling 233 can be used, such as a mechanical coupling (e.g., a clip, a hook, etc.), to selectively couple first coupling 233 with conveying member 216.

Conveying members 216 are similar to conveying members 16 described above, and further comprise at least one second coupling 253 positioned on an interior front and/or rear surface 218 of conveying members 216 to align second coupling 253 with first coupling 233. Second coupling 253 is thereby selectively couplable with first coupling 233 of pusher element 230. In the illustrated version, second coupling 253 includes a magnet, such as a permanent magnet that is made from a material (e.g., nickel, iron, cobalt, etc.) that is magnetized and creates its own persistent magnetic field having a pair of opposite north (N) and south (S) poles. Still other suitable configurations for second coupling 253 can be used, such as a mechanical coupling (e.g., a clip, a hook, etc.), to selectively couple second coupling 253 with pusher element 230.

Pusher element retention assembly 210 can be assembled with sortation conveyor 10 (see FIG. 1) such that an end cap 250 is positioned on an end portion of a pair of conveying members 216 of first conveying surface 14 (see FIG. 1). Each pair of conveying members 216, corresponding end caps 250, and corresponding pusher element 230 may be collectively referred to as a "flight." Pusher element 230 is positioned between the pair of conveying members 216 such that pusher element 230 is slidingly movable across first conveying surface 14 (see FIG. 1) between the pair of conveying members 216. Web 238 of pusher element 230 is aligned with an interior surface 218 of conveying member 216 such that the at least one first coupling 233 of pusher element 230 is aligned with at least one second coupling 253 of conveying member 216. With reference to FIG. 13, second coupling 253 may be positioned on a central portion of conveying member 216 such that conveying member 216 is configured to selectively maintain a position of pusher element 230 in a central portion of first conveying surface 14 (see FIG. 1).

During operation of sortation conveyor 10 (see FIG. 1), upstream of a divert location 26, first and second couplings 233, 253 attract to one another to retain the position of pusher element 230 adjacent to conveying member 216 at a home location in a central portion of conveying member 216. When pusher element 230 reaches divert location 26, if pusher element 230 is selected not to be diverted, first and second couplings 233, 253 remain coupled to maintain the position of pusher element 230 relative to conveying member 216 to inhibit pusher element 130 from drifting laterally across first conveying surface 14. This allows pusher element 130 to continue traveling at the home location along first conveying path 18 when pusher element 230 is not diverted.

If pusher element 230 is selected to be diverted, a switch assembly 160, as described above, can engage bearing 234 of pusher element 230 to guide pusher element 230 toward a divert conveyor 20. As pusher element 230 is guided toward a divert conveyor 20, first and second couplings 233, 253 are uncoupled to allow pusher element 230 to translate laterally between the pair of conveying members 216 across first conveying surface 14. For instance, pusher element 230 can travel to either side of first conveying surface 14 from the central portion between conveying members 216 to the spent location to engage select articles 100 (see FIG. 1) being conveyed on first conveying surface 14 and divert them to divert conveyor 20. Still other suitable configurations for pusher element retention assembly 210 will be apparent to one with ordinary skill in the art in view of the teachings herein.

For instance, in some versions, one of pusher element 230 or conveying member 216 can comprise a ferromagnetic metal or material (e.g., steel, iron, cobalt, nickel, magnetic plastic, etc.) instead of a magnet such that the magnet of the other one of pusher element 230 or conveying member 216 is attracted to the ferromagnetic material to selectively couple the pusher element 230 and conveying member 216. In some versions, both of pusher element 230 and conveying member 216 can comprise a ferromagnetic metal or material (e.g., steel, iron, cobalt, nickel, magnetic plastic, etc.) instead of a magnet. It will also be appreciated that the magnets of the pusher element 230 and conveying member 216 may have any suitable polarity. For example, the magnets may each have a single pole or may have multiple poles. In some other versions, first and second couplings 233, 253 can comprise a mechanical coupling instead of a magnetic coupling. For example, first and second couplings 233, 253 can comprise hook-and-loop fasteners or any other suitable type of mechanical coupling.

Figure 16:
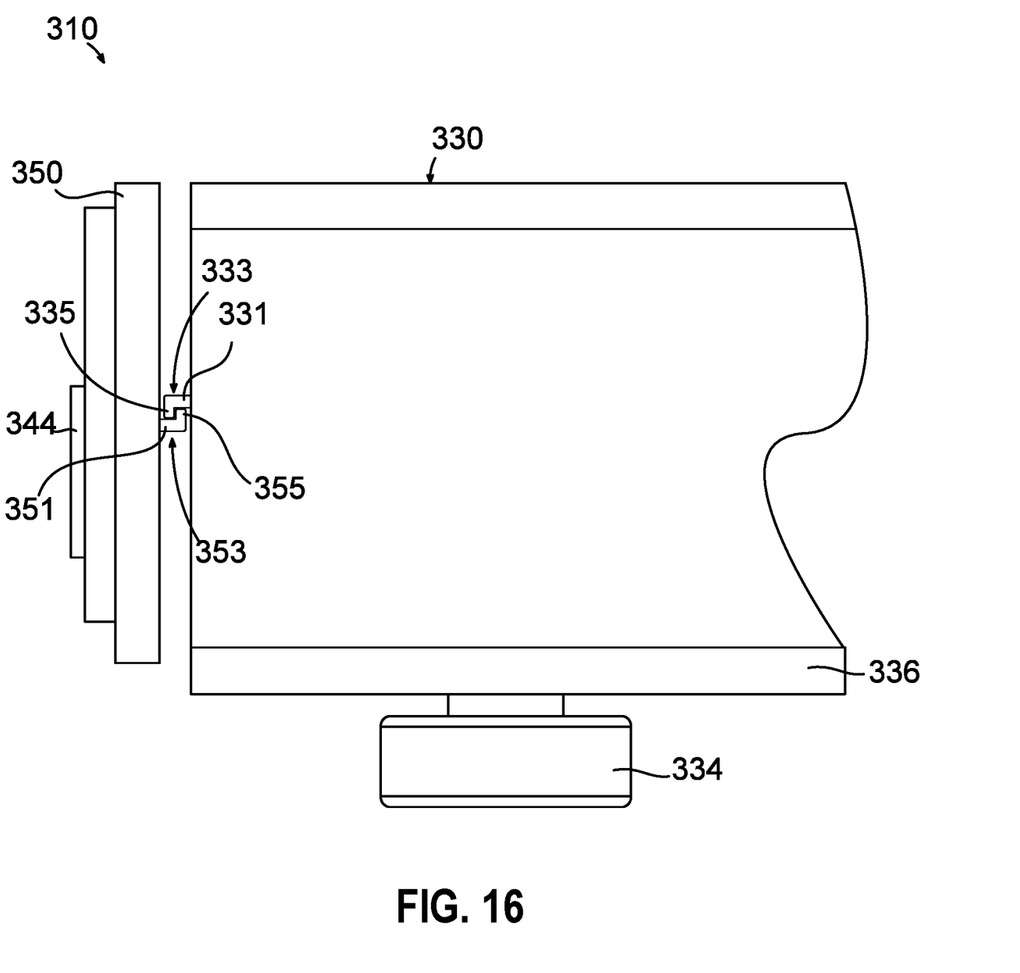
FIG. 16 is a schematic view of another exemplary pusher element retention assembly for use with the sortation conveyor of FIG. 1.

Referring to FIG. 16, another exemplary pusher element retention assembly 310 is shown comprising a pusher element 330 having a mechanical first coupling 333 and an end cap 350 having a mechanical second coupling 353. In the illustrated version, first coupling 333 is configured as a clip having a protrusion 331 extending outwardly from pusher element 330 and a hook 335 extending inwardly from protrusion 331. Second coupling 353 is configured as a clip having a protrusion 351 extending outwardly from end cap 350 and a hook 355 extending inwardly from protrusion 351. The respective hooks 335, 355 of first and second couplings 333, 353 are configured to engage each other, as shown in FIG. 16, to selectively maintain the position of pusher element 330 relative to end cap 350. One or both of hooks 335, 355 can be sufficiently flexible such that one or both of hooks 335, 355 slightly flex when hooks 335, 355 are coupled and/or uncoupled. Still other suitable configurations for pusher element retention assembly 310 will be apparent to one with ordinary skill in the art in view of the teachings herein.

Thus, any of pusher element retention assemblies 110, 210, 310 may be used to releasably couple a pusher element 130, 230, 330 to one or more of the other components of the corresponding flight, such as a corresponding endcap 150, 250, 350 and/or a corresponding conveying member 16, 216, to inhibit the pusher element 130, 230, 330 from inadvertently drifting laterally across the first conveying surface 14 until the pusher element 130, 230, 330 is selected to be diverted. It will be appreciated that any of pusher element retention assemblies 110, 210, 310 may be used to releasably couple a pusher element 130, 230, 330 to a component of the corresponding flight other than an endcap 150, 250, 350 or a conveying member 16, 216.

II. Examples

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A sortation conveyor comprising: a plurality of conveying members defining a first conveying surface extending in a longitudinal direction; a divert conveyor extending transversely relative to the longitudinal direction of the first conveying surface; a plurality of pusher elements selectively moveable across the first conveying surface; a plurality of end caps, wherein each end cap of the plurality of end caps is coupled to an end portion of a pair of conveying members of the plurality of conveying members; a first coupling positioned on at least one pusher element of the plurality of pusher elements; and a second coupling positioned on a select one or both of at least one end cap of the plurality of end caps and at least one conveying member of the plurality of conveying members, wherein the second coupling is selectively couplable with the first coupling to maintain the position of the at least one pusher element on the first conveying surface.

Example 2

The sortation conveyor of example 1, wherein the first and second couplings each comprise a magnet such that each magnet of the first and second couplings is configured to be attracted to the other magnet to couple the first coupling and the second coupling.

Example 3

The sortation conveyor of example 2, wherein each magnet includes opposite north and south poles such that the north pole of one of the first and second couplings is aligned with the south pole of the other one of the first and second couplings.

Example 4

The sortation conveyor of example 1, wherein one of the first and second couplings comprises a magnet and the other one of the first and second couplings comprises a ferromagnetic material such the magnet is configured to be attracted to the ferromagnetic material to couple the first coupling and the second coupling.

Example 5

The sortation conveyor of any one or more of examples 1 through 4, wherein the at least one pusher element comprises a base having a top member, a bottom member, and a web extending between the top member and the bottom member, wherein the top member is positioned above the at least one conveying member and wherein the bottom member is positioned below the at least one conveying member such that the base is translatable relative to the at least one conveying member.

Example 6

The sortation conveyor of example 5, wherein the first coupling is positioned on a side surface of the base of the at least one pusher element.

Example 7

The sortation conveyor of example 6, wherein the at least one end cap comprises two protrusions defining a gap therebetween that is configured to receive a portion of the at least one pusher element, wherein the second coupling is positioned within the gap of the at least one end cap.

Example 8

The sortation conveyor of example 7, wherein the at least one end cap is configured to maintain the position of the at least one pusher element at a side portion of the first conveying surface.

Example 9

The sortation conveyor of example 5, wherein the first coupling is positioned on an interior surface of the base of the pusher element.

Example 10

The sortation conveyor of example 9, wherein the second coupling is positioned on an interior surface of the at least one conveying member.

Example 11

The sortation conveyor of example 10, wherein the at least one conveying member is configured to maintain the position of the at least one pusher element at a central portion of the first conveying surface.

Example 12

The sortation conveyor of any one or more of examples 1 through 11, wherein the at least one pusher element is configured to translate across the first conveying surface when the first coupling is uncoupled from the second coupling.

Example 13

The sortation conveyor of any one or more of examples 1 through 12 further comprising a switch assembly having a switch coupled with an actuator, wherein the actuator is configured to actuate the switch from an unactuated positioned to an actuated position, wherein the switch is configured to be positioned away from the at least one pusher element when the switch is in the unactuated position, wherein the switch is configured to engage the at least one pusher element when the switch is in the actuated position to uncouple the first coupling and the second coupling.

Example 14

The sortation conveyor of example 13, wherein the switch comprises an arcuate surface configured to guide the at least one pusher element across the first conveying surface.

Example 15

A pusher element retention assembly for use with a sortation conveyor, the pusher element retention assembly comprising a first coupling positioned on a pusher element and a second coupling positioned on a select one or both of an end cap and a conveying member, wherein the second coupling is selectively couplable with the first coupling to maintain the position of the pusher element relative to the select one or both of the end cap and the conveying member.

Example 16

The pusher element retention assembly of example 15, wherein a select one or both of the first coupling and the second coupling comprise a magnet such that the magnet is configured to selectively couple the first coupling and the second coupling.

Example 17

A method of operating a sortation conveyor comprising a plurality of conveying members defining a first conveying surface extending in a longitudinal direction and a divert conveyor extending transversely relative to the longitudinal direction of the first conveying surface, the method comprising the steps of: positioning a pusher element at a home location on the first conveying surface to selectively couple a first coupling of the pusher element with a second coupling on positioned on a select one or both of an end cap and at least one conveying member of the plurality of conveying members; and retaining the coupling between the first and second couplings to maintain the position of the pusher element at the home location when the pusher element is not diverted by the sortation conveyor.

Example 18

The method of example 17 further comprising separating the coupling between the first and second couplings to allow the pusher element to translate across the first conveying surface from the home location to a spent location such that the pusher element is configured to engage an article being conveyed on the first conveying surface to divert the article to the divert conveyor.

Example 19

The method of any one or more of examples 17 through 18, wherein a select one or both of the first and second couplings comprise a magnet.

Example 20

The method of any one or more of examples 17 through 19 further comprising actuating a switch to engage the pusher element to uncouple the first coupling from the second coupling.

Example 21

A sortation conveyor comprising: (a) a pair of conveying members defining a conveying surface extending in a longitudinal direction; (b) an end cap fixedly secured to respective ends of the conveying members; and (c) a pusher element selectively moveable across the conveying surface, wherein the pusher element is releasably coupled to at least one of the conveying members or the end cap.

Example 22

The sortation conveyor of example 21, wherein the pusher element is releasably coupled to at least one of the conveying members.

Example 23

The sortation conveyor of example 22, wherein the pusher element is releasably coupled to the at least one of the conveying members near a respective end of the at least one of the conveying members.

Example 24

The sortation conveyor of example 22, wherein the pusher element is releasably coupled to the at least one of the conveying members near a central portion of the at least one of the conveying members.

Example 25

The sortation conveyor of example 21, wherein the pusher element is releasably coupled to the end cap.

Example 26

The sortation conveyor of any one or more of examples 21 through 25, wherein the pusher element is releasably coupled to the at least one of the conveying members or the end cap via magnetic attraction.

Example 27

The sortation conveyor of any one or more of examples 21 through 25, wherein the pusher element is releasably coupled to the at least one of the conveying members or the end cap via at least one mechanical coupling.

Example 28

The sortation conveyor of any one or more of examples 21 through 27, further comprising a divert conveyor extending transversely relative to the longitudinal direction.

Example 29

The sortation conveyor of any one or more of examples 21 through 28, further comprising a switch assembly configured to selectively release the pusher element from the at least one of the conveying members or the end cap.

Example 30

The sortation conveyor of example 29, wherein the pusher element is configured to translate across the conveying surface when the pusher element is selectively released from the at least one of the conveying members or the end cap.

Example 31

A sortation conveyor comprising: (a) a pair of conveying members defining a conveying surface extending in a longitudinal direction; (b) a pusher element selectively moveable across the conveying surface; (c) an end cap coupled to respective ends of the conveying members; (d) a first coupling positioned on the pusher element; and (e) a second coupling positioned on at least one of the conveying members or the end cap, wherein the second coupling is selectively couplable with the first coupling to maintain a position of the pusher element on the conveying surface.

Example 32

The sortation conveyor of example 31, wherein the first and second couplings each comprise a magnetic coupling.

Example 33

The sortation conveyor of example 31, wherein the first and second couplings each comprise a mechanical coupling.

Example 34

The sortation conveyor of any one or more of examples 31 through 33, further comprising a divert conveyor extending transversely relative to the longitudinal direction.

Example 35

The sortation conveyor of any one or more of examples 31 through 34, further comprising a switch assembly configured to selectively uncouple the first coupling from the second coupling.

Example 36

The sortation conveyor of example 35, wherein the pusher element is configured to translate across the conveying surface when the first coupling is selectively uncoupled from the second coupling.

Example 37

A method of operating a sortation conveyor comprising (i) a pair of conveying members defining a conveying surface extending in a longitudinal direction, (ii) an end cap fixedly secured to respective ends of the conveying members, and (iii) a pusher element selectively movable across the conveying surface, the method comprising: (a) releasably coupling the pusher element to at least one of the conveying members or the end cap such that the pusher element is positioned at a home location relative to the conveying members; and (b) maintaining the pusher element at the home location relative to the conveying members via the releasable coupling of the pusher element to the at least one of the conveying members or the end cap during advancement of the conveying members in the longitudinal direction until the pusher element is diverted.

Example 38

The method of example 37, further comprising diverting the pusher element, wherein diverting the pusher element includes selectively releasing the pusher element from the at least one of the conveying members or the end cap to allow the pusher element to translate across the conveying surface from the home location to a spent location.

Example 39

The method of any one or more of examples 37 through 38, wherein releasably coupling the pusher element to at least one of the conveying members or the end cap includes magnetically attracting at least a portion of the pusher element to at least a portion of the at least one of the conveying members or the end cap.

Example 40

The method of any one or more of examples 37 through 38, wherein releasably coupling the pusher element to at least one of the conveying members or the end cap includes mechanically coupling at least a portion of the pusher element to at least a portion of the at least one of the conveying members or the end cap.

Having shown and described various embodiments of the present innovation, further adaptations of the methods and systems described herein may be accomplished by appropriate modifications by one of ordinary skill in the art without departing from the scope of the present innovation. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present innovation should be considered in terms of the following claims and is understood not to be limited to the details of structure and operation shown and described in the specification and drawings.

What is claimed is:

1. A sortation conveyor comprising:
   (a) a pair of conveying members defining a conveying surface extending in a longitudinal direction;
   (b) an end cap fixedly secured to respective ends of the conveying members;
   (c) a pusher element selectively moveable across the conveying surface;
   (d) at least one first coupling positioned on the pusher element;
   (e) at least one second coupling positioned on at least one of the conveying members or the end cap, wherein the at least one second coupling is selectively couplable with the at least one first coupling; and
   (f) at least one switch assembly configured to engage the pusher element below the conveying surface resulting in uncoupling of the at least one first coupling from the at least one second coupling, to thereby selectively release the pusher element from the at least one of the conveying members or the end cap.

2. The sortation conveyor of claim 1, wherein the pusher element is releasably coupled to at least one of the conveying members.

3. The sortation conveyor of claim 2, wherein the pusher element is releasably coupled to the at least one of the conveying members near a respective end of the at least one of the conveying members.

4. The sortation conveyor of claim 2, wherein the pusher element is releasably coupled to the at least one of the conveying members near a central portion of the at least one of the conveying members.

5. The sortation conveyor of claim 1, wherein the pusher element is releasably coupled to the end cap.

6. The sortation conveyor of claim 1, wherein each of the at least one first coupling and the at least one second coupling include at least one magnetic coupling.

7. The sortation conveyor of claim 1, wherein each of the at least one first coupling and the at least one second coupling include at least one mechanical coupling.

8. The sortation conveyor of claim 1, further comprising a divert conveyor extending transversely relative to the longitudinal direction.

9. The sortation conveyor of claim 8, wherein the switch assembly includes a switch surface configured to guide a portion of the pusher element positioned below the pair of conveying members toward the divert conveyor.

10. The sortation conveyor of claim 1, wherein the pusher element is configured to translate across the conveying surface when the pusher element is selectively released from the at least one of the conveying members or the end cap.

11. The sortation conveyor of claim 1, wherein a portion of the pusher element positioned below the pair of conveying members includes a bearing.

12. The sortation conveyor of claim 1, wherein the at least one first coupling includes:
   (i) a home-side first coupling positioned on a home side of the pusher element, and
   (ii) a spent-side first coupling positioned on a spent side of the pusher element; and
   wherein the at least one second coupling includes:
   (i) a home-side second coupling positioned on a home side of the conveying surface, and
   (ii) a spent-side second coupling positioned on a spent side of the conveying surface.

13. A sortation conveyor comprising:
   (a) a pair of conveying members defining a conveying surface extending in a longitudinal direction;
   (b) a pusher element selectively moveable across the conveying surface, wherein the pusher element includes a portion positioned below the conveying surface;
   (c) an end cap coupled to respective ends of the conveying members;
   (d) a first coupling positioned on the pusher element;
   (e) a second coupling positioned on at least one of the conveying members or the end cap, wherein the second coupling is selectively couplable with the first coupling to maintain a position of the pusher element on the conveying surface; and
   (f) a switch assembly configured to selectively uncouple the first coupling from the second coupling,
   wherein the first coupling is configured to be uncoupled from the second coupling in response to the switch assembly engaging the portion of the pusher element positioned below the conveying surface.

14. The sortation conveyor of claim 13, wherein the first and second couplings each comprise a magnetic coupling.

15. The sortation conveyor of claim 13, wherein the first and second couplings each comprise a mechanical coupling.

16. The sortation conveyor of claim 13, further comprising a divert conveyor extending transversely relative to the longitudinal direction.

17. The sortation conveyor of claim 13, wherein the pusher element is configured to translate across the conveying surface when the first coupling is selectively uncoupled from the second coupling.

18. A method of operating a sortation conveyor comprising (i) a pair of conveying members defining a conveying surface extending in a longitudinal direction, (ii) an end cap fixedly secured to respective ends of the conveying members, and (iii) a pusher element selectively movable across the conveying surface, the method comprising:

(a) releasably coupling the pusher element to at least one of the conveying members or the end cap such that the pusher element is positioned at a home location relative to the conveying members;

(b) maintaining the pusher element at the home location relative to the conveying members via the releasable coupling of the pusher element to the at least one of the conveying members or the end cap during advancement of the conveying members in the longitudinal direction until the pusher element is diverted; and (c) diverting the pusher element, wherein diverting the pusher element includes engaging a switch assembly with a portion of the pusher element positioned below the pair of conveying members, thereby selectively releasing the pusher element from the at least one of the conveying members or the end cap to allow the pusher element to translate across the conveying surface from the home location to a spent location.

19. The method of claim 18, wherein releasably coupling the pusher element to at least one of the conveying members or the end cap includes magnetically attracting at least a portion of the pusher element to at least a portion of the at least one of the conveying members or the end cap.

20. The method of claim 18, wherein releasably coupling the pusher element to at least one of the conveying members or the end cap includes mechanically coupling at least a portion of the pusher element to at least a portion of the at least one of the conveying members or the end cap.

\* \* \* \* \*